United States Patent [19]

Wargo

[11] 4,120,201
[45] Oct. 17, 1978

[54] THERMOCOUPLE TEMPERATURE MEASUREMENT CIRCUIT HAVING COLD JUNCTION COMPENSATION

[75] Inventor: Thomas J. Wargo, Waukegan, Ill.

[73] Assignee: Partlow Corporation, New Hartford, N.Y.

[21] Appl. No.: 779,182

[22] Filed: Mar. 18, 1977

[51] Int. Cl.² ............................................. G01K 7/12
[52] U.S. Cl. ..................................................... 73/361
[58] Field of Search ................... 73/1 F, 361; 324/105

[56] References Cited

U.S. PATENT DOCUMENTS

| | | | |
|---|---|---|---|
| 3,461,380 | 8/1969 | McGhee | 73/361 X |
| 3,903,743 | 9/1975 | Noller | 73/361 |
| 3,921,453 | 11/1975 | Platzer, Jr. | 73/361 |
| 3,956,686 | 5/1976 | Tanaka | 73/361 X |

*Primary Examiner*—Charles A. Ruehl
*Attorney, Agent, or Firm*—Andrus, Sceales, Starke & Sawall

[57] ABSTRACT

A thermocouple temperature measuring circuit has input terminals connectable to the thermocouple to form the cold junctions of the thermocouple. An input amplifier amplifies the thermocouple signal. A cold junction temperature compensation circuit includes means for sensing the temperature of the cold junctions and for providing an output signal which exhibits a predetermined coefficient between cold junction temperature and output signal magnitude. The output signals of the amplifier and compensation circuit are summed at a summing junction and provided to an output amplifier for supply to a temperature indicating meter. A bias means is also coupled to the summing junction for providing a bias suitable for adjusting the magnitude of the output signal in accordance with the low temperature to be indicated on the meter. The gain of the output amplifier may be adjusted so that the variation in output signal responsive to hot junction temperatures is sufficient to drive the meter through the temperature range displayed on the meter.

9 Claims, 3 Drawing Figures

U.S. Patent    Oct. 17, 1978    4,120,201
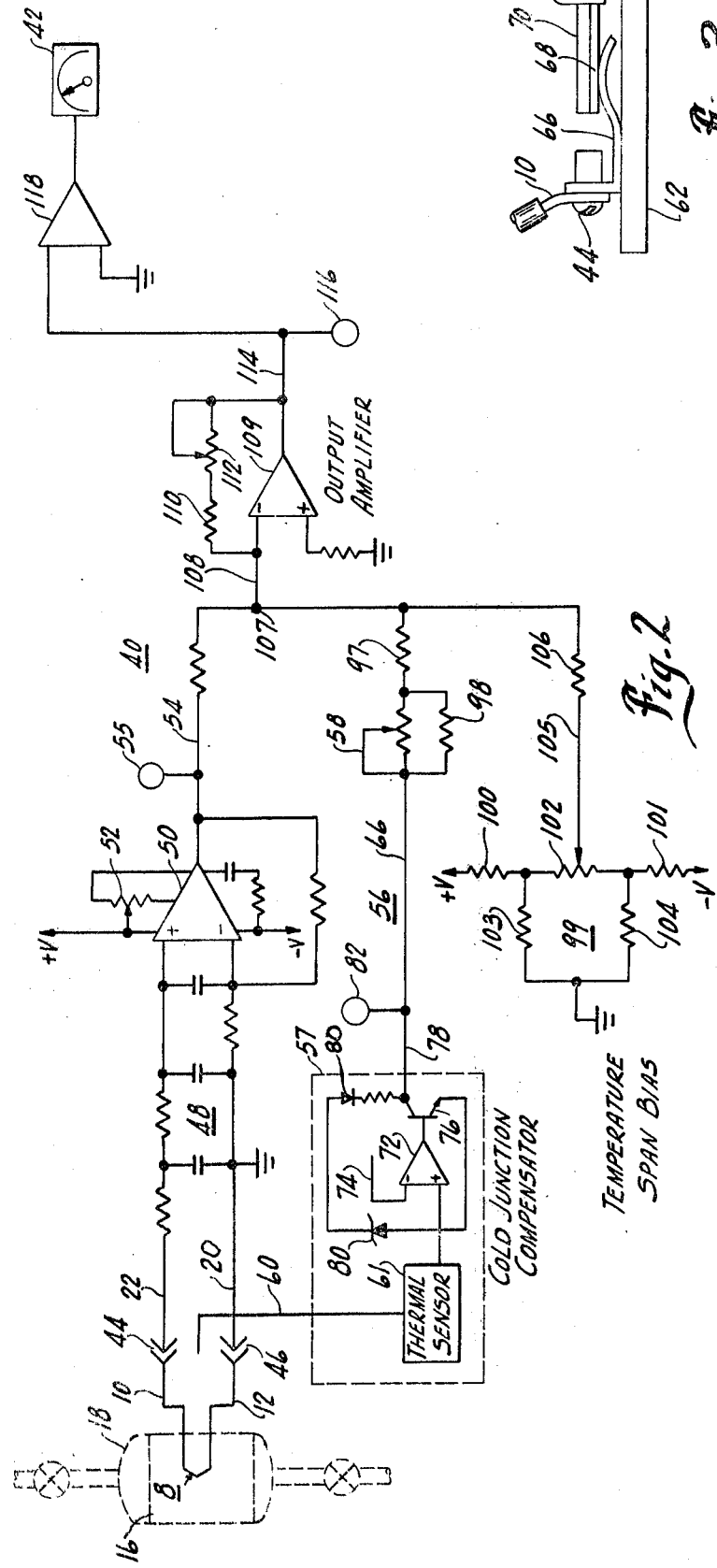
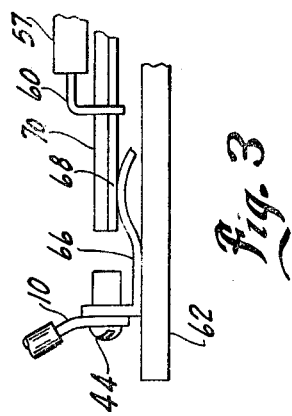
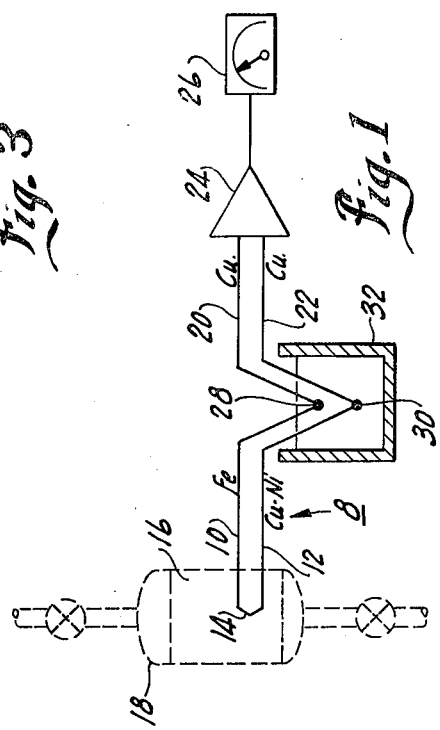

THERMOCOUPLE TEMPERATURE MEASUREMENT CIRCUIT HAVING COLD JUNCTION COMPENSATION

BACKGROUND OF THE INVENTION — FIELD OF THE INVENTION

The present invention relates to a thermocouple temperature measurement circuit which provides cold junction compensation and temperature range and span adjustment.

BACKGROUND OF THE INVENTION — DESCRIPTION OF THE PRIOR ART

A thermocouple is commonly used for temperature measurement. In its simplest form, a thermocouple consists of two wires of unlike metals joined so as to form an electrical circuit. An electromotive force exists in the circuit whenever one of the junctions of the two dissimilar metal wires is at a different temperature than the other junction. The emf for any given pair of metals depends on the temperature difference between the junctions.

A thermocouple may be used as a thermometer by keeping one junction at some known temperature, placing the other junction in contact with the body whose temperature is to be ascertained, and measuring the resulting emf. The temperature of the body is obtained by reference to the appropriate table of emfs. Or, the galvanometer on which the emf is indicated may be calibrated directly in degrees.

The classical technique for keeping the junction not applied to the body at a known temperature is to immerse it in an ice bath. For this reason, this junction is called the "cold junction". The junction applied to the body whose temperature is to be measured is termed the "hot junction".

However, it will be easily appreciated that for industrial applications the establishment and maintenance of an ice bath is awkward, if not impossible, and seriously detracts from the simplicity, ruggedness and economy which characterize thermocouples. For this reason, in industrial circuitry, the ice bath is omitted, the cold junction allowed to assume ambient temperature, and appropriate compensation provided so that the output of the circuit is a true indication of hot junction temperature.

For example, a temperature sensitive resistor may be placed in proximity to the cold junction so as to be responsive to the ambient temperature existing at the junction. The temperature sensitive resistor is inserted in one arm of a bridge circuit which alters the emf produced by the thermocouple in a manner which compensates for the ambient temperature of the cold junction.

Such a technique suffers several shortcomings. The resistor temperature responsive characteristics often do not closely approximate the temperature — emf relationship of the thermocouple. If the type of thermocouple is changed, or if the operating range of the hot junction is changed, it is necessary to remove one resistor and insert another, more appropriate, resistor. This has led to inflexibilities in the use of such as technique.

SUMMARY OF THE PRESENT INVENTION

It is, therefore, the object of the present invention to provide a thermocouple temperature measurement circuit which provides improved cold junction compensation. Specifically, it is an object of the present invention to provide such a circuit which eliminates the need to replace a temperature sensitive resistor and other components each time the temperature range or span to be measured is altered or the type of thermocouple is changed.

The circuit of the present invention includes input terminals connectable to the thermocouple and to an input amplifier. The input terminals form the cold junctions of the thermocouple. A cold junction temperature compensation means includes means for sensing the temperature of the cold junctions and providing an output signal which is responsive to the temperature of the cold junction. Means are provided for altering this signal to provide an output signal, the magnitude of which varies in a predetermined manner in accordance with the temperature of the cold junction.

A summing junction sums the thermocouple signal from the input amplifier and the cold junction temperature compensation signal from the compensation circuit. These signals are provided to an output amplifier and to the meter which indicates temperature. A bias means is coupled to the summing junction for providing a bias signal which adjusts the output to the low temperature indicated on the meter scale. The gain of the output amplifier means is adjusted so that the circuit may drive the meter full scale when maximum temperature is sensed by the thermocouple.

In the event the type of thermocouple is changed, the cold junction temperature compensation means is adjusted to alter the relationship of output signal magnitude to cold junction temperature in accordance with the properties of the new type of thermocouple. In the event the range and/or span of temperature to be indicated on the meter is altered, the bias means and/or output amplifier gain are altered accordingly.

BRIEF DESCRIPTION OF THE DRAWING

FIG. 1 is a schematic showing of a simple thermocouple temperature measuring circuit.

FIG. 2 is a schematic diagram of the thermocouple temperature measurement circuit of the present invention.

FIG. 3 is an elevational view of a means for ascertaining the temperature of the cold junction.

DETAILED DESCRIPTION OF THE PREFERRED EMBODIMENT

FIG. 1 shows a simple temperature measuring circuit employing thermocouple 8. Two wires 10 and 12 of unlike metals form hot junction 14. Wire 10 may be formed of iron while wire 12 is comprised on constantan, an alloy of approximately 55% copper and 45% nickel. A thermocouple so formed is known industrially as a Type J thermocouple. Hot junction 14 may be placed in contact with the body, the temperature of which is to be measured; for example, material 16 being processed in tank 18. The other ends of wires 10 and 12 are connected to wires 20 and 22 which lead to galvanometer 26 through amplifier 24. The voltage generated in thermocouple 8 is indicated on galvanometer 26. Wires 20 and 22 are the copper conductors typically used in electronic circuitry. The connection of iron wire 10 to copper wire 20 thus forms a second junction 28 while the connection of constantan wire 12 to copper wire 22 forms a third junction 30. These junctions are collectively termed the "cold" junction.

In order to employ thermocouple 8 as a temperature measuring device for material 16, the temperature of the cold junction must be accounted for. FIG. 1 shows immersing junctions 28 and 30 in ice bath 32 which holds the junctions at a constant, known temperature of 0° C. (32° F.).

With the temperature of the cold junction so fixed, the voltage existing in conductors 20 and 22 will be an indication of the temperature of hot junction 14. For example, if the voltage across conductors 20 and 22 is 5.05 millivolts, the temperature of hot junction 14 and material 16 may be found to be 96° C. by consulting the appropriate table. As noted supra, meter 26 may be calibrated to read directly in degress, thereby obviating the use of a thermocouple table.

Since the use of an ice bath is not practical in industrial circumstances, the ice bath is eliminated, the temperature of the cold junctions allowed to assume ambient levels, and a temperature sensitive resistor placed in proximity with junctions 28 and 30. This resistor may be employed in conjunction with a resistor bridge circuit to provide a bias signal to amplifier 24 which compensates the output signal of the amplifier for the ambient temperature of the cold junction. However, as noted supra, each time the temperature sensing range of the thermocouple or the thermocouple type is changed, the resistance of the resistor must be altered accordingly, resulting in a substantial disadvantage to this arrangement.

FIG. 2 shows the thermocouple temperature measurement circuit 40 of the present invention which provides improved cold junction compensation. The input of circuit 40 is connected to thermocouple 8 which is responsive to the temperature of material 16 in tank 18. The output of temperature control circuit 40 is connected to meter 42 which provides an indication of the temperature of material 16. Meter 42 is typically provided with a plurality of scales graduated in different temperature ranges for example, 0°–500° C., 0°–1000° C., 0°–1500° C., etc or portions thereof spanning for example 100°–500° C., 200°–500° C., 200°–400° C., etc.

Iron wire 10 and constantan wire 12 of thermocouple 8 are connected to copper wire input leads 20 and 22 through connectors 44 and 46, described in detail below, which form the cold junction of the thermocouple.

Conductors 20 and 22 are connected through a.c. noise filter 48 to input amplifier 50. Amplifier 50 may be an instrument grade amplifier exhibiting a very low voltage drift with temperature. The gain or amplification of amplifier 50 is typically established to be 100 by the ratio of feedback resistance to input resistance. Potentiometer 52 may be used to null the output of amplifier 50. The output of amplifier 50 is provided in conductor 54 containing test point 55.

Compensation for the ambient temperature of junctions 44 and 46, the cold junction of thermocouple 8, is provided by cold junction temperature compensation circuit 56. Cold junction temperature compensation circuit 56 includes a temperature signal means 57 for ascertaining the temperature of the cold junction 44–46 and for providing an electrical output signal having predetermined relationship between the sensed temperature and the signal magnitude, for example, an output signal which varies 10 millivolts for each 1° C. variation in the temperature of cold junction 44–46. Cold junction temperature compensation circuit 56 also includes a means, such as potentiometer 58, for altering the magnitude of the output signal of temperature signal means 57 by a factor indicative of the cold junction temperature characteristics of the particular type of thermocouple in use with circuit 40.

Cold junction temperature signal means 57 comprises an integrated circuit such as that sold by the National Semiconductor Corporatin of Santa Clara, California, under the designatin LM3911N. The integrated circuit includes sensor lead 60 which may be placed in proximity with the cold junction so as to be at the same temperature as the junction. As shown in FIG. 5, frame 62 contains a terminal post connector 44 for thermocouple lead 10. A similar connector is provided for lead 12. A spring 66 connects the terminal post with the printed conductor 68 of printed circuit board 70. Printed circuit board 70 mounts temperature signal means 57. Lead 60 extends through the printed circuit board 70 into the printed conductor 68 for temperature sensing purposes. Lead 60 is electrically insulated from printed circuit conductor 68 Lead 60 transmits the sensed temperature to an internal thermo-electric means 61 which provides a corresponding electrical output signal.

The integrated circuit also includes amplifier 72, one input of which is coupled to means 61 and the temperature responsive signal. The other input receives a bias signal in conductor 74. The output of amplifier 72 is provided to driver transistor 76 which provides the output signal in conductor 78. Zener diode 80 serves to regulate the voltage in circuit 56. Conductor 78 contains test point 82 at the output of temperature signal means 57.

It is necessary to ascertain the effects of cold junction ambient temperature on the output of the thermocouple so that proper cold junction temperature compensation may be provided. These effects may be determined by holding the hot junction of the thermocouple at a constant temperature, establishing the temperature of the cold junction at a plurality of differing temperatures and noting the output voltage of the thermocouple. For example, for a Type J thermocouple (Fe and Cu-Ni wires), the output of the thermocouple varies approximately 52 microvolts/degree C. That is, a variation of 1° C. in the temperature of the cold junctiions alters the output of the thermocouple 52 microvolts. For a Type K thermocouple (Ni-Cr and Ni-Al wires) the alteration is approximately 41.1 microvolts/degree C. Similar cold junction temperature characteristics may be derived for each type of thermocouple.

The cold junction temperature characteristics may be used to develope a coefficient of cold junction temperature compensation. For a Type J thermocouple this would be 0.52; for a Type K thermocouple this would be 0.411, etc.

The output signal of amplifier 72 in conductor 78 is altered in accordance with the cold junction temperature coefficient of the particular type of thermocouple in use with the circuit. For a Type J thermocouple, the 10 millivolts/degree C. output signal of temperature signal means 57, noted supra, is multiplied by 0.52 and thus attenuated so that it varies by 5.2 millivolts/degree C. The multiplication by 100, i.e. 52 microvolts/degree C. to 5.2 millivolts/degree C., corresponds to the amplification provided to the thermocouple signal in leads 22 and 24 provided by amplifier 50. The foregoing attenuation may be accomplished by potentiometer 58 in conductor 78. Resistors 97 and 98 insure that a minimal amount of resistance is present in conductor 78 in the event potentiometer 58 is placed in the zero resistance position.

Since altering of the output of amplifier 72 may be simply and easily accomplished by a potentiometer, it is preferred that the variation of the output signal of temperature sensing means 57 responsive to cold junction temperature changes be greater than the attenuated signal characteristic for any type of thermocouple with which the circuit is intended for use, thereby to permit use of the above described coefficients. If the variation in the output signal of circuit 57 is less than the thermocouple cold junction temperature characteristics, an amplifier may be employed to increase the output signal of circuit 57 to the thermocouple cold junction temperature characteristic.

Temperature span bias circuit 99 is employed to insert a bias in circuit 40 which causes the output signal of circuit 40 to meter 42 to be zero when the temperature of hot junction 14 is at the lower temperature on the temperature scale of the meter. For example, if the span of temperatures to be monitored is 450°–600° C., the scale of meter 42 may be so graduated and the output signal to meter 42 from circuit 40 must be zero volts when material 16 and hot junction 14 are at 450° C. The necessary bias may be provided by a center tapped voltage divider comprised of resistors 100 and 101, and rheostat 102 which are connected to ground through resistors 103 and 104. The bias signal is provided in conductor 105 through resistor 106.

The output signals of input amplifier 50, cold junction temperature compensation circuit 56, and temperature span bias circuit 99 are summed at summing junction 107 and provided in conductor 108 to the inverting input of output amplifier 109. Amplifier 109 may comprise an operational amplifier. The non inverting input of amplifier 109 is grounded. The output signal of amplifier 109 is provided in conductor 114, containing test point 116, to meter driver 118 and to meter 42.

The gain of operational amplifier 109 is determined by the resistance of resistor 110 and potentiometer 112 in the feedback path of the amplifier in conjunction with the resistors connected to summing junction 107. This gain is established so that the output voltage of circuit 40 drives meter 42 full scale when the temperature of material 16 and hot junction 14 is at the uper limit of the desired temperature span. In the example given above, 10 volts may be needed to drive meter 42 full scale. If, however, the input to operational amplifier is only 3 volts when material 16 and hot junction 14 are at 600° C., the gain of amplifier 108 is adjusted to provide the 10 volt output signal necessary to drive a meter 42 full scale so that the meter reads 600° C.

In operation, input amplifier 50 provides the signal from thermocouple 8 to summing junction 107. Cold junction temperature compensation circuit 56, also connected to summing junction, augments the signal from thermocouple 8 by the amount needed to overcome the voltage alteration resulting from the ambient temperature of cold junction 44–46. Temperature span bias circuit 99 also connected to summing junction, provides an additive or subtractive bias necessary to make the output signal from summing junction 107 to amplifier 109 zero at the lower temperature of the temperature scale of meter 42. The gain of output amplifier 109 is adjusted to provide a signal which drives meter 42 full scale when the temperature of material 16 and thermocouples 8 is at the maximum temperature shown on the scale of meter 42.

To insure this operation, circuit 40 is calibrated as follows. Thermocouple 8 is disconnected from circuit 40 and a millivolt source connected to connectors 44 and 46. In contrast to thermocouple circuits employing a resistor bridge for compensation, this millivolt source need not be calibrated, as along as it remains constant during the adjustment procedure.

Potentiometer 112 in the feedback path of output amplifier 109 is turned to the minimal or zero resistance position as is potentiometer 58 connected to the output of temperature signal means 57 of cold junction temperature compensation circuit 56. With temperature span bias potentiometer 102 in the zero resistance position, the input and feedback resistances of the operational amplifier forming output amplifier 109 are the same so that the gain of the amplifier is one. With cold junction compensator potentiometer 58 in the zero resistance position, no attenuation to the output signal of cold junction temperature compensation circuit 56 is provided so that the output signal to summing junction 107 is the product of the existing cold junction temperature times the 10 millivolts per degree C characteristics of the output of temperature signal means 57. This voltage will appear at test point 82.

To provide the cold junction temperature compensation, the output signal of temperature signal means 57 must be multiplied by the coefficient of temperature compensation for the particular type of thermocouple being used with the circuit. Thus, for a Type J thermocouple, the output voltage of temperature signal means 57 is multiplied by 0.52. This may be accomplished by adjusting the voltage of output amplifier at test point 116 by means of potentiometer 58 so that the output voltage of output amplifier 109 equals the product of the temperature compensation coefficient and the output voltage of means 57 at test point 82.

The millivolt source is then adjusted so that the output voltage of output amplifier 109 is equal in magnitude and polarity to the value, in millivolts, from the table established for the thermocouple for the minimum temperature of the range or span of temperatures to be measured times a factor of 100. Span bias potentiometer 102 is then adjusted so that the output voltage of output amplifier 109 is zero volts and the needle of meter 42 is at the left hand end of the scale of the meter under this condition.

The millivolt output of thermocouple 8 for the highest temperature of the span or range to be measured is determined by reference to the thermocouple table. The voltage corresponding to the minimal temperature of the span or range is subtracted from this voltage and the millivolt source adjusted so that the output voltage of output amplifier 109 is equal in magnitude and polarity to the value, in millivolts, times 100 of the voltage difference so determined. The gain of output amplifier 109 is then adjusted by potentiometer 112 in the feedback path of output amplifier such that the output voltage of output amplifier 109 is sufficient to drive the meter full scale. This, for example, may be 10 volts.

The circuitry is now calibrated and ready for operation.

To change the range of operatin of the circuitry, for example, to change from a zero to 600° temperature span to zero to 1000° temperature span it is necessary only to reconnect the millivolt source, ascertain the millivolt output of the new maximum temperature, subtract the minimum temperature and adjust the millivolt source such that the output of output amplifier 109 is equal in magnitude and polarity to the value in millivolts times 100 of the voltage difference. Potentiometer 112 is then adjusted so that the output voltage of output amplifier 109 equals the voltage needed to drive the meter 42 full scale.

If it is desired to change the span of operation of the circuit, for example, to reduce the zero to 600° C. temperature range to a 450°-600° C. temperature span, potentiometer 112 is moved to the zero resistance position. The millivolt source is reconnected and adjusted so that the output of output amplifier 109 is equal in magnitude and polarity to the value in millivolts, times 100, from a thermocouple table for the new minimum temperature of the revised range. Temperature span bias potentiometer 102 is adjusted so that the output of output amplifier 109 is zero volts. The millivolt source is then adjusted so that the output of output amplifier 109 is equal in magnitude and polarity to the difference in millivolts, times 100 between the maximum and minimum temperatures of the new span. Potentiometer 112 is thereafter adjusted so that the output of output amplifier 109 is a voltage suitable for driving meter 42 full scale.

In the event the type of thermocouple used with circuit 40 is altered, the calibration procedure described above, is repeated. The procedure is identical except that potentiometer 58 is adjusted in accordance with the coefficient of temperature compensation for the new type of thermocouple. For example, if a Type K thermocouple is used the coefficient is 0.411.

Various modes of carrying out the invention are contemplated as being within the scope of the following claims particularly pointing out and distinctly claiming the subject matter which is regarded as the invention.

I claim:

1. A circuit for providing cold junction temperature compensation to a thermocouple having a hot junction applied to a body for temperature measuring purposes, said circuit providing an output signal for driving a signal responsive temperature indicating meter, said circuit comprising:

input terminals connectable to said thermocouple for forming the cold junction for which temperature compensation must be provided and for receiving an input signal from the thermocouple;

an input amplifier coupled to said input terminals for amplifying the thermocouple input signal;

cold junction temperature compensation means including integrated circuit means having a temperature sensor means located in proximity to the cold junction for sensing the temperature of the cold junction and amplifier means providing a signal, the magnitude of which varies in accordance with the temperature of the cold junction, said cold junction temperature compensation means further including means for applying a predetermined cold junction temperature compensation coefficient to the signal of said integrated cicuit means to provide an output signal having a predetermined relationship between signal magnitude and cold junction temperature;

summing junction means for receiving the output signals from said input amplifier and cold junction temperature compensation means for providing a temperature indicating signal which is compensated for cold junction temperature;

bias means coupled to said summing junction for providing a bias signal; and output amplifier means having an input connected to said summing junction and an output connectable to said temperature indicating meter, said output amplifier means having means for adjusting the gain thereof.

2. The circuit of claim 1 wherein said input amplifier has a low temperature responsive drift characteristic.

3. The circuit according to claim 1 wherein said input amplifier has a predetermined gain.

4. The circuit according to claim 1 wherein said coefficient applying means comprises resistive means.

5. The circuit according to claim 1 wherein said coefficient applying means comprises amplification means.

6. The circuit according to claim 1 wherein said circuit is further defined as providing an output signal indicative of a temperature range or span commencing at a predetermined low temperature and wherein said bias means is further defined as means for providing a bias signal to said summing junction which causes the output signal to the temperature indicating meter to indicate the low temperature when said thermocouple is at said low temperature.

7. The circuit according to claim 6 wherein said bias means comprises resistive means.

8. The circuit according to claim 6 further defined as providing an output signal indicative of a temperature range or span terminating at a predetermined high temperature and wherein the gain adjusting means of said output amplifier means is further defined as means for adjusting the gain of said output amplifier means for providing an output signal indicative of the high temperature when said thermocouple is at said high temperature.

9. The circuit according to claim 1 further defined as providing an output signal indicative of a temperature range or span terminating at a predetermined high temperature and wherein the gain adjusting means of said output amplifier means is further defined as means for adjusting the gain of said output amplifier means for providing an output signal to the temperature indicating meter indicative of the high temperature when said thermocouple is at said high temperature.

* * * * *